(12) United States Patent
Xue et al.

(10) Patent No.: US 6,687,219 B1
(45) Date of Patent: Feb. 3, 2004

(54) DETECTING AND COUNTING NODE PORT LOOP INITIALIZATION ORIGINATION

(75) Inventors: Qing Xue, Irvine, CA (US); Hossein Hashemi, Mission Viejo, CA (US); Sam Su, Irvine, CA (US)

(73) Assignee: Emulex Corporation, Costa Mesa, CA (US)

( * ) Notice: Subject to any disclaimer, the term of this patent is extended or adjusted under 35 U.S.C. 154(b) by 302 days.

(21) Appl. No.: 09/640,564

(22) Filed: Aug. 16, 2000

(51) Int. Cl.[7] .............................................. H04L 12/26
(52) U.S. Cl. ...................................... 370/222; 370/457
(58) Field of Search ............................... 370/241, 242, 370/243, 245, 222, 252, 250, 258, 401, 400, 403, 404, 405, 453, 452, 457, 425, 460, 221, 254, 709

(56) References Cited

U.S. PATENT DOCUMENTS

| 5,751,715 A | | 5/1998 | Chan et al. | |
|---|---|---|---|---|
| 6,038,235 A | * | 3/2000 | Ho et al. | 370/462 |
| 6,101,166 A | | 8/2000 | Baldwin et al. | |
| 6,167,026 A | * | 12/2000 | Brewer et al. | 370/222 |
| 6,226,345 B1 | * | 5/2001 | Skergan | 377/37 |
| 6,483,843 B1 | * | 11/2002 | Su et al. | 370/425 |
| 6,560,205 B1 | * | 5/2003 | Corbett et al. | 370/258 |

* cited by examiner

Primary Examiner—Chi Pham
Assistant Examiner—Alexander O. Boakye
(74) Attorney, Agent, or Firm—Fish & Richardson P.C.

(57) ABSTRACT

A hub port in a Fiber Channel loop includes a hub data source, a loop initialization data detect circuit, and a loop initialization counter. The hub data source supplies data to the hub port from the Fiber Channel loop. The loop initialization data detect circuit is configured to detect valid loop initialization sequences from an attached node port and the hub data source. The loop initialization counter is configured to increment a count value of the valid loop initialization sequence from the attached node port if the loop initialization sequence from the node port does not match the valid loop initialization sequence from the hub data source. This state indicates that the loop initialization sequence is initiated by the attached node port.

13 Claims, 3 Drawing Sheets

DETECTING AND COUNTING NODE PORT LOOP INITIALIZATION ORIGINATION

BACKGROUND

The present invention relates to electronic network systems, and more specifically to a loop network hub designed such that loop initializations are detected and counted.

Electronic data systems are often interconnected using network communication systems. Approaches that have been developed for computer network architectures include area-wide networks and channels. Traditional networks (e.g., LAN's and WAN's) may offer flexibility and relatively large distance capabilities. Channels, such as the Enterprise System Connection (ESCON) and the Small Computer System Interface (SCSI), have been developed for high performance and reliability. Channels often use dedicated short-distance connections between computers or between computers and peripherals.

Features of both channels and networks have been incorporated into the Fiber Channel standard. Fiber Channel systems combine the speed and reliability of channels with the flexibility and connectivity of networks. Fiber Channel products often run at high data rates, such as 266 Mbps or 1062 Mbps. These speeds are sufficient to handle quite demanding applications, such as uncompressed, full motion, high-quality video.

There are at least three ways to deploy a Fiber Channel network, which include simple point-to-point connections, arbitrated loops, and switched fabrics. The simplest topology is the point-to-point configuration, which simply connects any two Fiber Channel systems directly. Arbitrated loops are Fiber Channel ring connections that provide shared access to bandwidth via arbitration. Switched Fiber Channel networks, called "fabrics", are a form of cross-point switching.

Conventional Fiber Channel Arbitrated Loop (FC-AL) protocols provide for loop functionality in the interconnection of devices or loop segments through node ports. However, direct interconnection of node ports may be problematic since a failure at one node port in a loop may cause failure of the entire loop. This difficulty may be overcome in conventional Fiber Channel technology through the use of hubs. Hubs may include a number of hub ports interconnected in a loop topology. Node ports are connected to hub ports, forming a star topology with the hub at the center. Hub ports which are not connected to node ports or which are connected to failed node ports are bypassed. Therefore, the loop may be maintained despite removal or failure of node ports.

SUMMARY

The inventors recognized that detecting and counting origination of loop initializations in a Fiber Channel Arbitrated Loop topology is desirable.

The present disclosure includes a hub port in a Fiber Channel loop. The hub port includes a hub data source, a loop initialization data detect circuit, and a loop initialization counter. The hub data source supplies data to the hub port from the Fiber Channel loop. The loop initialization data detect circuit is configured to detect valid loop initialization sequences from an attached node port and the hub data source. The loop initialization counter is configured to increment a count value of the valid loop initialization sequence from the attached node port if the loop initialization sequence from the node port does not match the valid loop initialization sequence from the hub data source. This state indicates that the loop initialization sequence is initiated by the attached node port.

The present disclosure also includes a method for detecting and counting loop initializations in a loop network. The method includes detecting a first valid loop initialization sequence received from a node port, and a second valid loop initialization sequence received from a hub data source. The detection of the two sequences from the node port and the hub data source occurs substantially simultaneously. The method also includes comparing the first and second valid loop initialization sequences. Finally, a count value is incremented if the first and second valid loop initialization sequences differ.

DETAILED DESCRIPTION

Figure 1A:
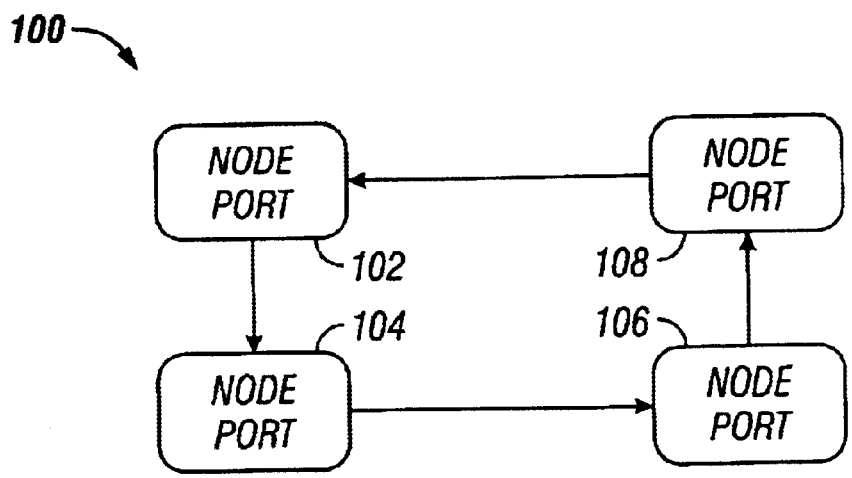
FIG. 1A shows a node port to node port loop.

A loop configuration 100 is illustrated in FIG. 1A. Four node ports 102, 104, 106, 108 are shown joined together node port to node port. Each node port represents a connection to a device or to another loop. Node port 102 is connected to node port 104 such that data is transmitted from node port 102 to node port 104. Node port 104 is in turn connected to node port 106 that is in turn connected to node port 108. Node port 108 is connected to the first node port, node port 102. In this manner, a loop data path is established from node port 102 to node port 104 to node port 106 to node port 108 back to node port 102.

Figure 1B:
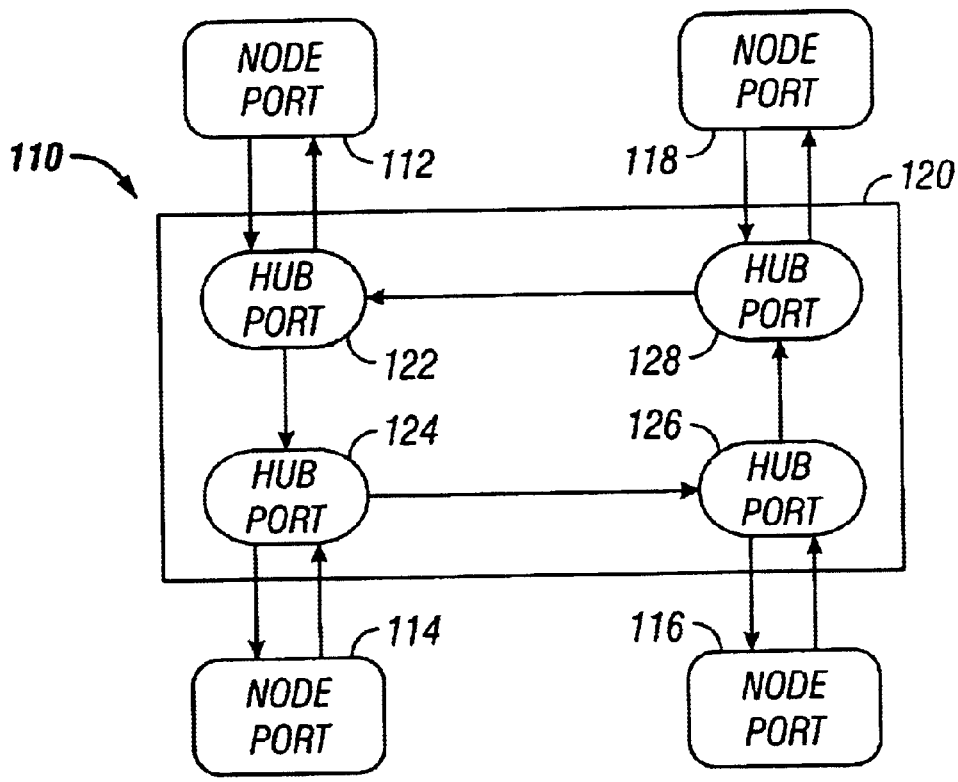
FIG. 1B shows a loop including a hub.

FIG. 1B illustrates a loop 110 where node ports 112–118 are organized in a physical star topology with a hub 120 in the center. Node port 112 is connected to a hub port 122 in hub 120, as are node ports 114, 116 and 118 to their own respective hub ports 124, 126, and 128. A loop is internal to hub 120; where hub ports 122–128 form a loop data path similar to the loop configuration 100 shown in FIG. 1A.

The use of a hub as a central component to a loop network allows bypassing of certain hub ports. This can be useful when one or more hub ports are not connected to node ports, or when one or more hub ports are connected to node ports that have failed. Each hub port often contains circuitry that provides a bypass mode for the hub port. When a hub port is in bypass mode, data received by the hub port from the previous hub port in the loop may be passed directly to the next hub port in the loop.

Under FC-AL protocols, a loop initialization process is used,to provide each node port attached to the loop with a unique address, referred to as an Arbitrated Loop Physical Address (AL-PA). Loop initialization is invoked under FC-AL protocols by generating a sequence of Loop Initialization Primitive (LIP) ordered sets. Five forms of the LIP sequences allow the hub port in the initializing state to indicate the reason,for loop initialization: LIP (F7,F7), LIP (F7,AL_PS), LIP (F8,F7), LIP (F8,AL_PS), and LIP (AL_PD,AL_PS). The LIP (F8,XX) form is the indication of loop initialization due to loop failure.

Figure 2:
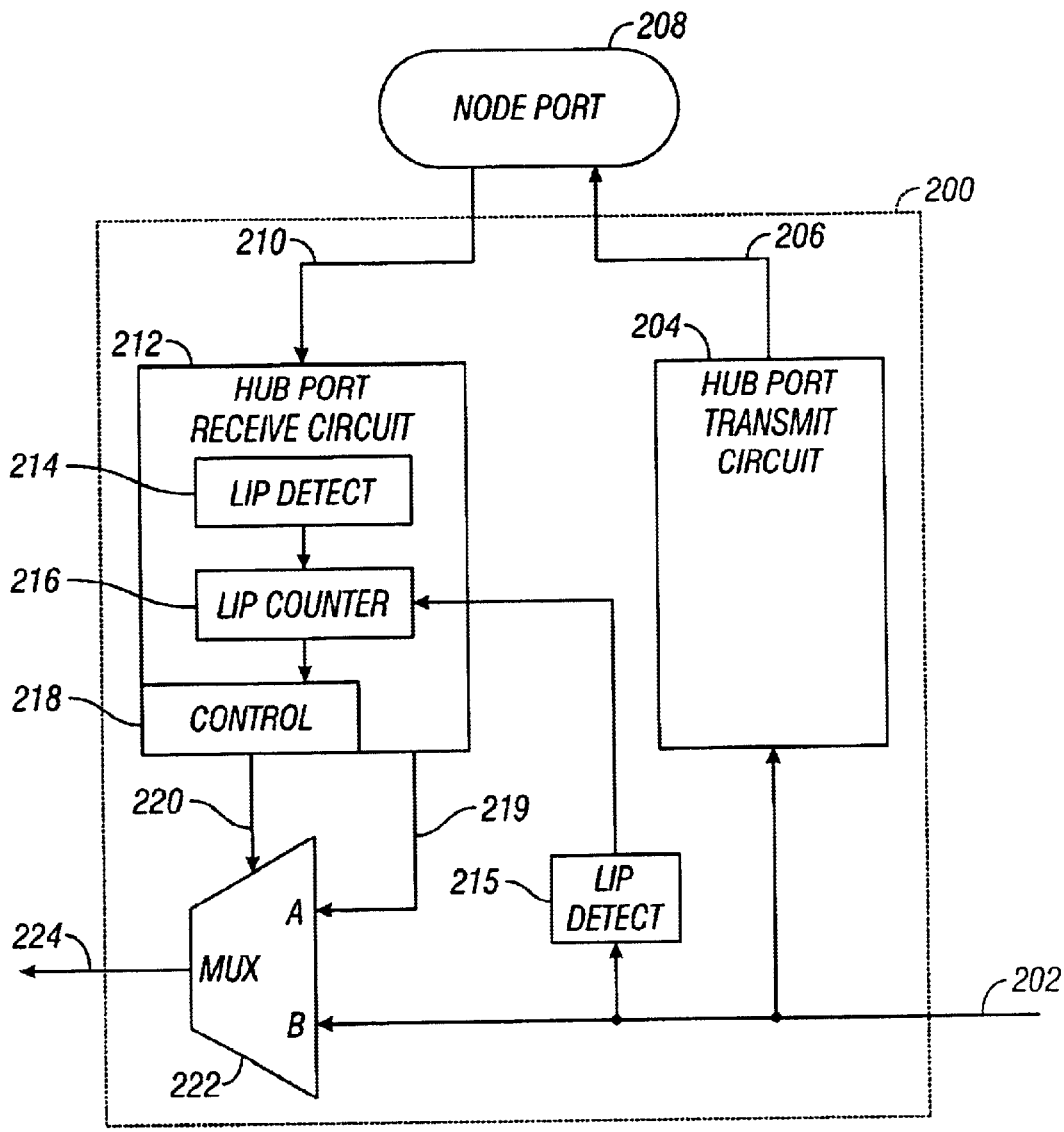
FIG. 2 shows a block diagram of a hub port according to an embodiment.

FIG. 2 illustrates internal components of a hub port 200 according to an embodiment. In the illustrated embodiment, the hub port 200 provides detection and counting of LIP origination, which may include detection of incoming order sets originating from an attached node port.

An incoming internal hub link 202 enters the hub port 200 from a previous hub port in the loop (not shown). The incoming internal hub link 202 is connected to a hub port transmit circuit 204. Thus, data from the previous hub port passes along the internal hub link 202 into the hub port 200 and then into the hub port transmit circuit 204. The hub port transmit circuit 204 sends the data received through a data channel 206 out to a node port 208 after converting the data into a form usable by the node port 208. Alternatively, the data channel 206 may be connected to a hub port in a different hub, allowing interconnection of hub to hub.

The node port 208 outputs data to the hub port 200 via a data channel 210. The data channel 210 is connected to a hub port receive circuit 212. The hub port receive circuit 212 converts data received from the node port 208 into a form usable inside the hub. In one embodiment, the hub port receive circuit 212 includes a loop initialization data detect circuit 214, a loop initialization counter 216, and a hub port output control circuit 218. The hub port receive circuit 212. outputs data via a hub port output line 219. In an FC-AL implementation, the loop initialization data detect circuit 214 is a LIP detect circuit.

The loop initialization data detect circuit 214 provides detection of incoming ordered sets originating from the attached node port 208. If a non-LIP ordered set followed by a LIP ordered set is detected, the loop initialization data detect circuit 214 may save the first LIP ordered set. LIP (F8,XX) ordered set may be excluded because it indicates a loop failure. If the LIP detect circuit 214 continuously receives two more consecutive LIP ordered sets that are identical to the first saved LIP ordered set, the detect circuit 214 may indicate a valid loop initialization sequence. Thus, the LIP detect circuit 214 signals a valid LIP primitive sequence detection when a non-LIP ordered set followed by three consecutive LIP ordered sets are detected.

In the illustrated embodiment, the loop initialization counter 216 of each hub port is configured to count only the loop initialization coming from its attached node port 208. Thus, a valid LIP primitive sequence detection from the LIP detect circuit 214 may not be sufficient to indicate a valid LIP originating from the attached node port 208. The loop initialization counter 216 should not increment if the source of the initialization is a node port attached to a different hub port. Therefore, in order to properly identify the source of the loop initialization, another LIP primitive sequence detect circuit 215 may be needed.

As mentioned above, the LIP ordered set in the currently receiving LIP primitive sequence is saved in the LIP detect circuit 214. The LIP ordered set that is coming from the previous hub port through the incoming internal hub link 202 may be saved by the LIP detect circuit 215. If the ordered sets or primitive sequences match, the source of the initialization is a node port from a different hub port. In this case, the loop initialization counter 216 is not incremented. Otherwise, if the primitive sequences do not match, it indicates that the source of the loop initialization is the attached node port 208. The attached node port 208 may have generated a new loop initialization that is different from the data coming from the previous hub port. The loop initialization counter 216 may then be incremented to indicate that the attached node port 208 initiated a valid loop initialization. Therefore, the loop initialization counter 216 may be used to monitor the frequency of loop initialization from a particular node port attached to a hub port. Subsequent to the detection of a loop initialization from an attached node port, the loop initialization counter 216 may no longer increment until next valid LIP order set preceded by a non-LIP ordered set is detected from the attached hub port.

In some embodiments, the loop initialization counter 216 may track loop failures by counting LIP (F8,XX) ordered sets only. In other embodiments, monitored data may be used for statistical or diagnostic purpose. For example, more frequent loop initializations than average may indicate a bad port or bad port connection to the hub.

The hub port output control circuit 218 outputs control signals via, a hub port output control line 220. The hub port output line 219 is connected to a first input A of a switching device 222, such as a multiplexer. The incoming internal hub link 202 is connected to a second input B of the switching device 222.

The hub port output control line 220 is connected to a control input of the switching device 222. The switching device 222 selects a single input A or B to be output depending upon the control signal generated by the hub port output control circuit 218. The switching device 222 output is sent to outgoing internal hub link 224. The outgoing internal hub link 224 passes data to the next hub port in the hub in the same manner that the internal hub link 202 passes into the hub port 200, forming a loop.

When no device is attached to the hub port 200, the hub port output control circuit 218 may hold the hub port 200 in bypass mode. Data received from the previous hub port on the incoming internal hub link 202 is output to the outgoing internal hub link 224 by selecting the input B of the switching device 222. In bypass mode, data on the incoming internal hub link 202 may enter the input B of the switching device 222. The data may be output unchanged onto the outgoing internal hub link 224 to be passed to the next hub port in the loop (not shown).

Figure 3:
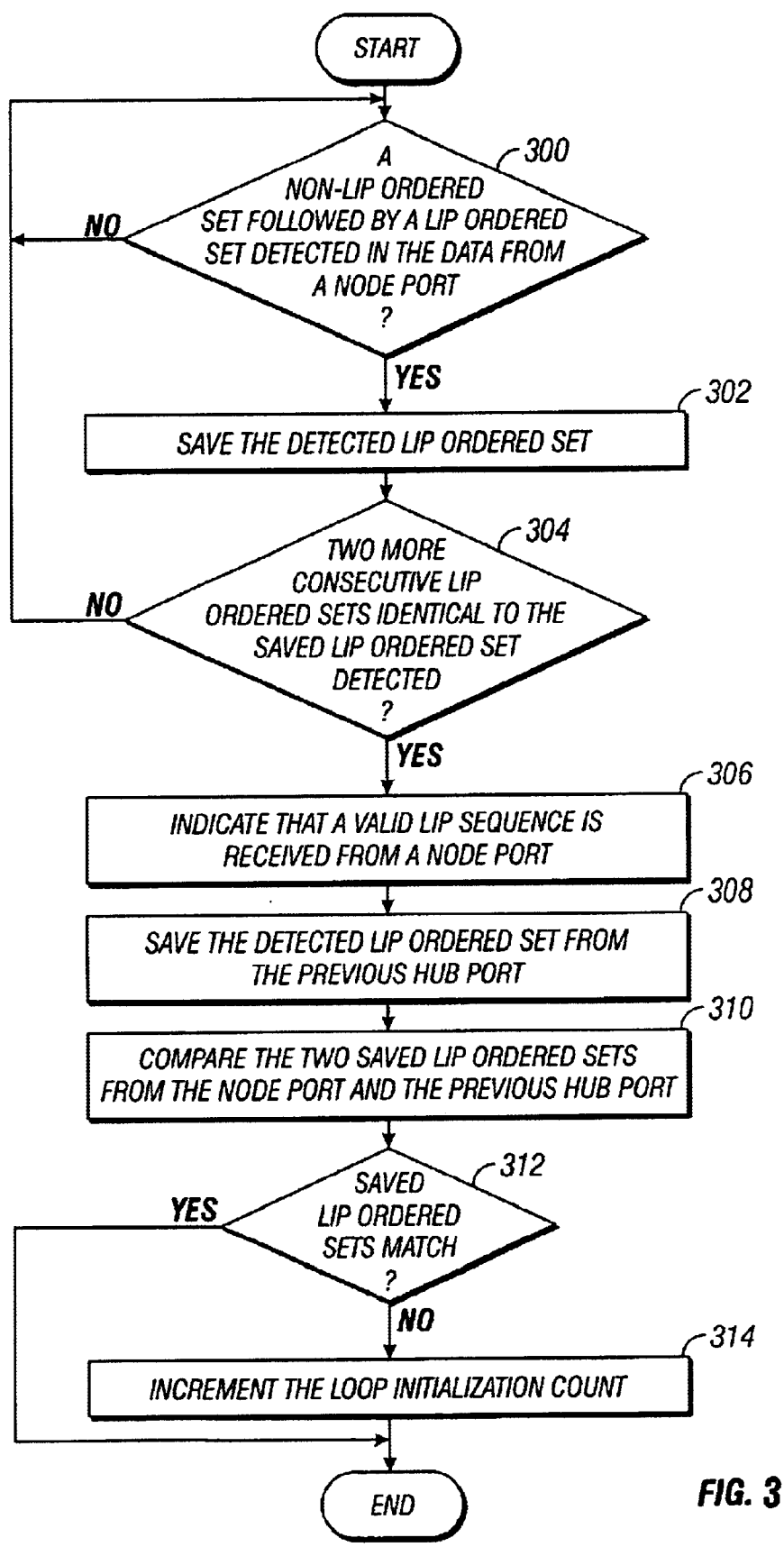
FIG. 3 shows a method for detecting and counting loop initializations in accordance with an embodiment.

FIG. 3 illustrates a method for detecting and counting loop initializations in accordance with an embodiment. At 300, data from a node port is monitored to detect a non-LIP ordered set followed by a LIP ordered set. If the specified sequence of ordered sets is received, the received LIP ordered set is saved at 302. The node port data may be further monitored to detect at least two more consecutive LIP ordered,sets identical to the saved LIP ordered set at 304. If the correct sequence of identical LIP ordered sets is detected, receipt of a valid LIP sequence from the node port is indicated at 306. Substantially simultaneous with the monitoring of data from the attached node port for a valid LIP ordered sets, a detected LIP ordered set from the previous hub port is saved at 308. The saved LIP ordered sets from the node port and the previous hub port are then compared at 310. If the save LIP ordered sets do not match at 312, the loop initialization count is incremented by one at 314.

While specific embodiments of the invention have been illustrated and described, other embodiments and variations are possible. For example, other LIP primitive sequences may be used to detect valid loop initialization.

All these are intended to be encompassed by the following claims.

What is claimed is:

1. A hub port in a Fiber Channel loop, comprising:
   a hub data source for supplying data to the hub port from the Fiber Channel loop;
   an attached node port to supply data to the hub port;

a loop initialization data detect circuit coupled to the attached node port and the hub port, to detect valid loop initialization sequences from the attached node port and the hub data source; and a loop initialization counter to increment a count value of said valid loop initialization sequence from said attached node port if the loop initialization sequence from the node port does not match the valid loop initialization sequence from the hub data source, indicating that the loop initialization sequence is from the attached node port.

2. The hub port of claim 1, wherein said valid loop initialization sequence includes loop initialization primitive ordered sets.

3. The hub port of claim 2, wherein said loop initialization detect circuit includes at least first and second LIP detectors, said first LIP detector operating to detect valid LIP ordered set from the attached node port, and said second LIP detector operating to detect valid LIP ordered set from the hub data source.

4. The hub port of claim 2, wherein said loop initialization data detect circuit flags all loop initialization primitive ordered sets excluding LIP (F8,XX) as valid loop initialization sequences.

5. The hub port of claim 2, wherein said loop initialization data detect circuit flags only LIP (F8,XX) as valid loop initialization sequences.

6. The hub port of claim 1, further comprising:

a hub port output control signal to select data from the hub data source or the attached node port; and a hub port output control circuit to receive said hub port output control signal, and to pass data from one of the hub data source or the attached node port in accordance with said control signal.

7. The hub port of claim 1, wherein valid loop initialization sequence includes three consecutive LIP ordered sets preceded by a non-LIP ordered set.

8. A hub port in a Fiber Channel, comprising:

a switching device, including a first input, a second input, and a control input;

a hub data source coupled to the first input of the switching device;

a node data source coupled to the second input of the switching device;

a loop initialization data detect circuit coupled to the node data source and the hub data source, said detect circuit setting detect signals indicating detection of valid loop initialization when particular sequences are detected from the node data source and the hub data source; and a loop initialization counter coupled to the loop initialization data detect circuit, and to increment a count when said detect signals indicate detection of valid loop initialization with difference sequences from the node data source and the hub data source.

9. A Fiber Channel having a hub, comprising:

a plurality of node ports;

a plurality of hub ports in the hub, each hub port coupled to one of said plurality of node ports, each hub port including:

a switching device, including a first input, a second input, and a control input, a hub data source coupled to the first input of the switching device, a node data source coupled to the second input of the switching device, a loop initialization data detect circuit coupled to the node data source and the hub data source, said detect circuit setting detect signals indicating detection of valid loop initialization when particular sequences are detected from the node data source and the hub data source, and a loop initialization counter coupled to the loop initialization data detect circuit, and to increment a count when said detect signals indicate detection of valid loop initialization with difference sequences from the node data source and the hub data source.

10. The Fiber Channel of claim 9, wherein said valid loop initialization includes loop initialization primitive ordered sets.

11. The Fiber Channel of claim 10, wherein said loop initialization data detect circuit includes at least first and second LIP detectors, said first LIP detector operating to detect valid LIP ordered set from the node data source, and said second LIP detector operating to detect valid LIP ordered set from the hub data source.

12. A method for detecting and counting loop initializations in a loop network, comprising:

first detecting a first valid loop initialization sequence received from a node port;

second detecting a second valid loop initialization sequence received from a hub data source, said second detecting occuring substantially simultaneous with said first detecting;

comparing said first and second valid loop initialization sequences; and incrementing a count value if said first and second valid loop initialization sequences differ.

13. The method of claim 12, wherein said first detecting the first valid loop initialization sequence includes detecting a non-LIP ordered set followed by at least three consecutive LIP ordered sets.

* * * * *